US005703460A

United States Patent [19]

Planells Almerich

[11] Patent Number: 5,703,460

[45] Date of Patent: Dec. 30, 1997

[54] SYSTEM FOR CHARGING THE BATTERY OF WATCHES WITHOUT OPENING THE LID

[76] Inventor: Francisco Planells Almerich, Apartado Correos 148, Valencia, Spain, E-46900

[21] Appl. No.: 666,313

[22] PCT Filed: Nov. 3, 1995

[86] PCT No.: PCT/ES95/00122

§ 371 Date: Sep. 19, 1996

§ 102(e) Date: Sep. 19, 1996

[87] PCT Pub. No.: WO96/14607

PCT Pub. Date: May 17, 1996

[30] Foreign Application Priority Data

Nov. 4, 1994 [ES] Spain .................................. P9402278

[51] Int. Cl.$^6$ ............................ H01M 10/46; G04C 3/00

[52] U.S. Cl. ................................................ 320/2; 368/204

[58] Field of Search ................................ 320/2; 368/203, 368/204, 205; 310/191

[56] References Cited

U.S. PATENT DOCUMENTS

| | | | |
|---|---|---|---|
| 4,118,922 | 10/1978 | Ichiyanagi | 368/204 X |
| 4,323,996 | 4/1982 | Ganter | 368/204 X |
| 4,873,677 | 10/1989 | Sakamoto et al. | 368/204 |

*Primary Examiner*—Peter S. Wong
*Assistant Examiner*—Patrick B. Law
*Attorney, Agent, or Firm*—Richard M. Goldberg

[57] ABSTRACT

The battery (4) is never removed from its location. The battery is charged through the difference of voltage maintained by means of an external source. The two poles of the source may be connected to the watch (1) through a plug if the lid of the watch is connected to the earth of its circuit, and through two plugs if the lid is isolated, or by a method of connection without penetration. The orifices (7) for inserting the plugs may be provided with appropriate isolators. In the case of two plugs, and in order to avoid an erroneous connection, the plugs may have different and incompatible shapes. Application to watches and apparatuses which are battery-operated.

7 Claims, 2 Drawing Sheets

SYSTEM FOR CHARGING THE BATTERY OF WATCHES WITHOUT OPENING THE LID

BACKGROUND OF THE INVENTION

The present invention is directed to a watch or clock battery charging system not requiring the cover to be taken off.

The technical field of this patent is that of watches or clocks, particularly digital and analogical wristwatches or clocks which are powered by a button type battery, combined with battery chargers, particularly button battery chargers. This system is applicable to other types of devices which work with said type of batteries or similar.

Statement of the prior state of the art ESP91011267 for a circuit and device for recharging electrical batteries and other specific use which constitutes a specific invention for recharging batteries, particularly useful for recharging button batteries. Also ESP9400027/1 for charging electrical batteries carries out the function of charging button batteries through a voltage drop maintaining the amperage through the voltage differential, specially suitable for the purpose set forth in this patent, as this charging system does not damage the mechanism of the watch to which the battery is connected.

Until now, the recharging of button batteries turned out to be impossible, as the charging systems previously known of prevented the charge from being accepted, and even brought about the explosion of said button batteries on occasions.

Furthermore the watches which have a button type battery all have the common characteristic of these being replaced by opening the cover.

The duration of the battery is fairly long. Nevertheless, when a watch is opened, damp, dust and, definitively, dirt enter the watch with consequent deterioration of the initial conditions of the same. For this reason the ideal solution would be to have a watch which is never opened.

This is difficult in mechanical watches which break down, though theoretically they never need to be opened for them to work, but it becomes impossible in electronic watches, in which the power source is inside them.

OBJECTS AND SUMMARY OF THE INVENTION

This invention proposes a watch or clock battery charging system that does not require the cover to be taken off, based on the possibility of recharging button type batteries without needing them to be taken out.

Another problem which can be understood to exist in these conditions is that during the recharging process the watch or clock could undergo an overload which might damage one of its tiny circuits. Nevertheless, this does not occur with the type of charge applied to said watches or clocks so that even when these have stopped through lack of power, at the initial contact they start again with the full accuracy of each particular watch or clock, and after the charging time, these could never stop at all if the recharging is done at sufficiently regular periods, such as every year, or every two years, according to the capacity of the battery.

In watches which only withstand fresh water, the external contacts can be outside to facilitate the charging contact, with these being of any kind. Nevertheless, in those designed to be submerged in salt water one has to prevent the electrolytic contact of water with salts dissolved in this, so that the contact should in this case be able to be insulated from water contact, as otherwise the battery could wear out quickly, through the resistant closure of the circuit.

This invention thus envisages insulation systems which involve the protection of the positive pole of the circuit, the negative one being the casing of the watch itself, or a circuit similarly able to be insulated if suitable on the other side of the watch, with a contact access incompatible with the positive one. All of this does not prevent one of the buttons from being used for activation as a connection for a possible charging clip.

BRIEF DESCRIPTION OF THE DRAWINGS

In order to make the following explanation clearer, two sheets of drawings are enclosed which in the figures represent the essence of this invention as an example.

DESCRIPTION OF THE PREFERRED EMBODIMENTS

Figure 1:
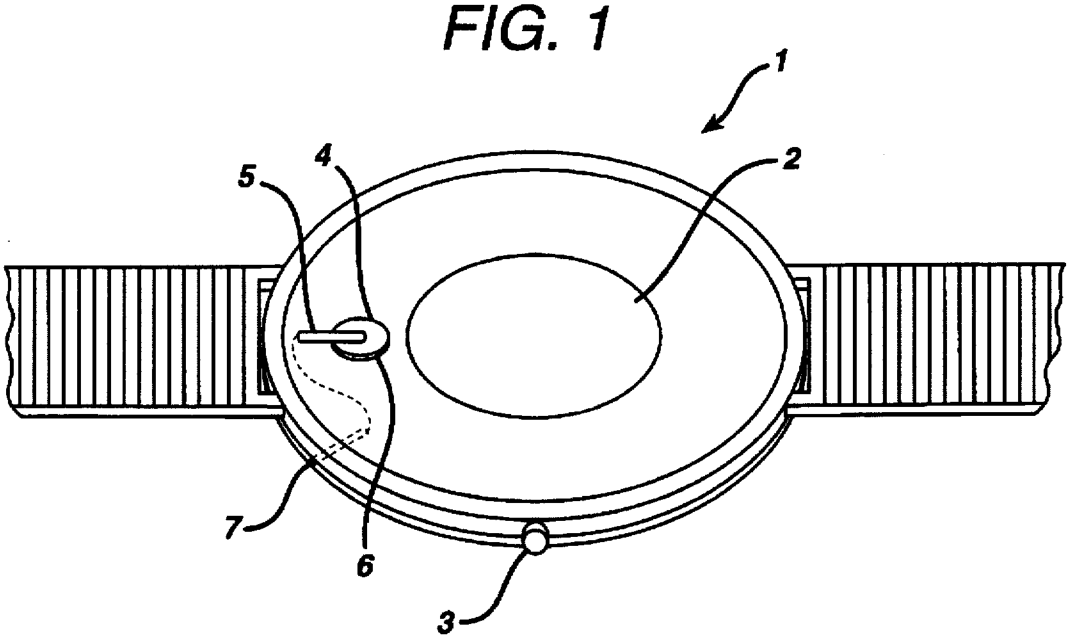
FIG. 1 shows a perspective view of an open watch.
Figure 2:
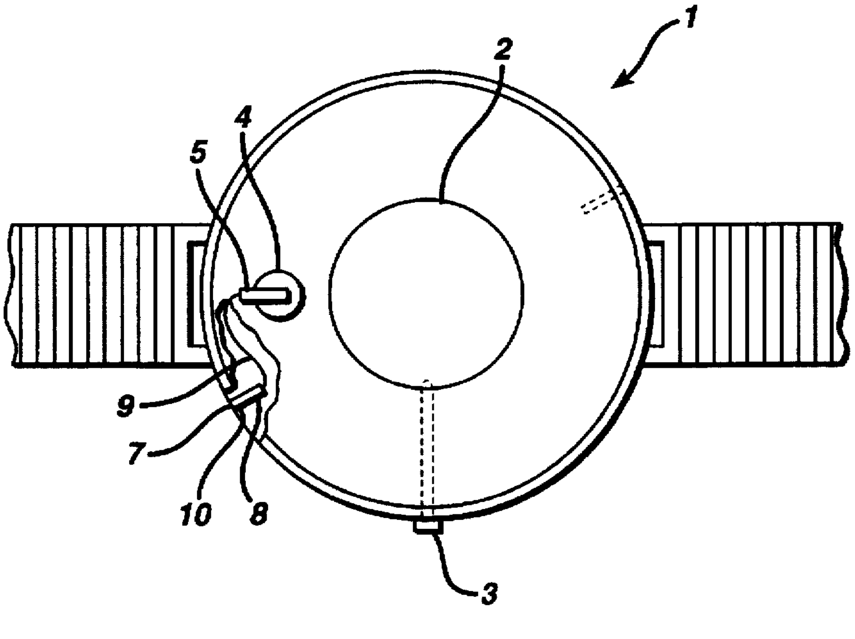
FIG. 2 shows a plan view of the same watch.
Figure 3:
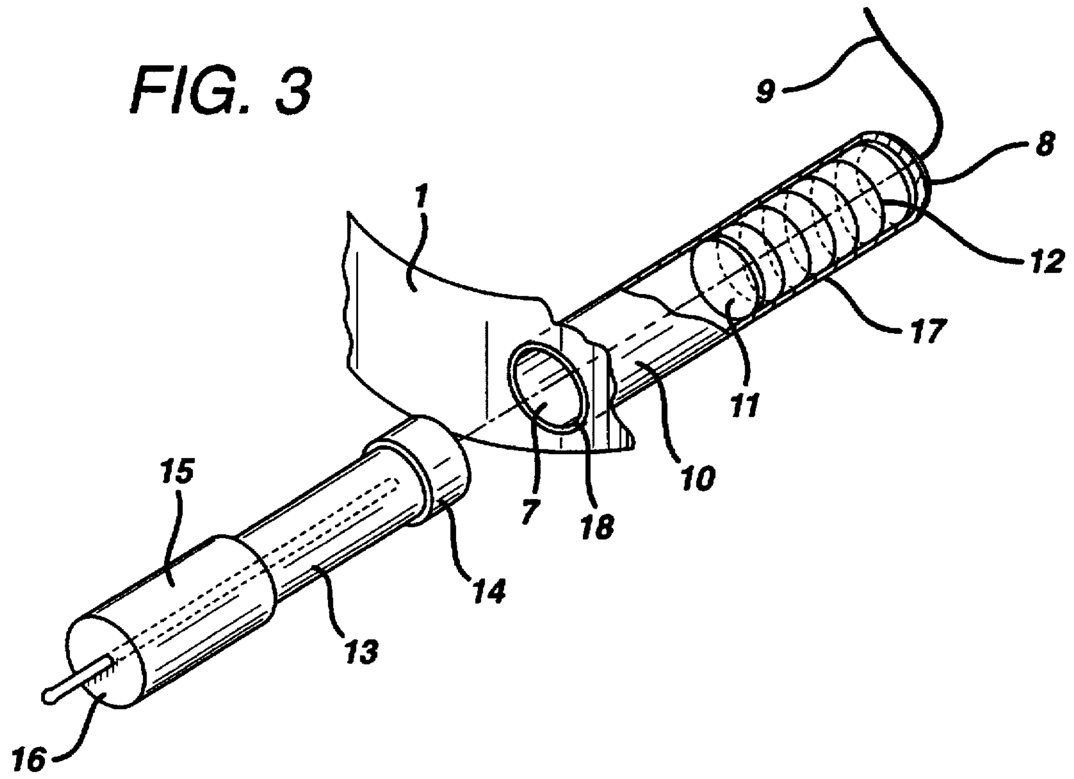
FIG. 3 shows a perspective view of a detail of an example of connection for recharging.

In said figures 1 is the watch, 2 the watch mechanism, 3 the crown, 5 the connection and securing of the battery anode, 6 the battery cathode, 7 the connection hole of the charging anode, 8 the contact of the charging anode at the end of the connection hole, 9 being the connection to the battery, 10 the insulating interior of the connection hole, 11 the movable "O" ring, 12 the spring that moves the "O" ring, 13 the connection plug or pin, 14 the end or contact of the pin, 15 the shaft or insulated handle of the pin, 16 the internal connection between the contact 14 and the charger, 17 the conducting surface connected to the anode of the connection hole, 18 the rim which prevents the "O" ring from getting out through the action of spring 12, and 19 shows the hole, for example of the anode pin, 20 the anode pin, 21 the diameter of hole 19, 22 the diameter of pin 20, 23 the hole for the cathode pin, 24 the larger diameter of hole 23, 25 being the smaller diameter of hole 23, 26 the pin, for example oval shaped, 27 the larger diameter of pin 26, 28 being the smaller diameter of pin 26.

A watch thus fitted with this structure has an identical shape to the traditional ones, and can even be opened to repair this where necessary, but nevertheless also can have its battery charged from the outside, thus making it impossible to cause the breakdowns and damage suffered by others.

In the case of watches or clocks that have the negative or earth of the battery connected to the chassis, it is not necessary to charge these by inserting two pins. Nevertheless, when the watch or clock being charged has insulation to prevent the chassis coming into contact with the negative of the battery there can be a second pin, in a different shape to the first one, for example, oval, so that neither of these can be inserted in the opposite polarity hole, thus preventing any mistakes.

It is clear from the explanation given above that the position of the charging pins does not matter, in so far as this has to match each kind of clock or watch, particularly watches for immersion, especially those which can be submerged in sea water through having greater protection than watches that do not resist water, without this constituting a circumstance which affects the right requested by this patent.

Figure 4:
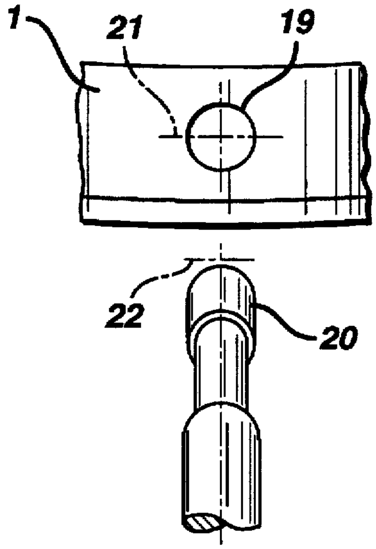
FIG. 4 shows a perspective view of a portion of the watch.
Figure 5:
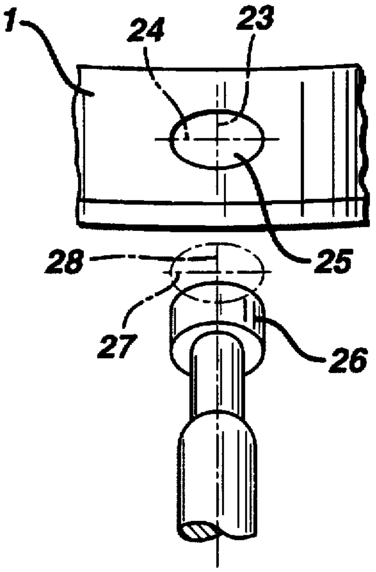
FIG. 5 shows a perspective view of another portion of the watch.

The dual pin device for watches which have the negative of the battery insulated from the casing of the watch can be formed of a type of pin incompatible with the other. This could be for example the one set out in FIGS. 4 and 5, which has an anode, a circular diameter pin 22, of a size that can linked through hole 19 and its diameter 21. This circular pin is of greater diameter than the smaller diameter 25 of hole 23, and less than the greater diameter 24 of hole 23. The one for the cathode is for example oval or elliptical, and its larger diameter 27 is of greater size than diameter 21 of the previous one, and the smaller diameter 28 is of smaller size than diameter 21 of the other polarity, preventing the possibility of mixing up the polarities. The example described does not restrict realization with other forms of pin. Neither does it prevent the pin from being done without where necessary, with its external connection being for example to one of the buttons by means of a charging clip.

This system is for industrial application in making watches which are electrically driven by button batteries, and also for making calculators and other devices that work with rechargeable batteries.

I claim:

1. A system for charging a button battery of a watertight watch of a type having a body and cover, without taking off the cover, and without altering watertight conditions thereof, in which charging is performed by a voltage drop, while maintaining an amperage through a voltage differential, and with the battery including an anode and cathode, said system comprising:

an anode connection in the watch body for connection to the anode of the battery;

a cathode connection in the watch body for connection to the cathode of the battery;

a first hole in the watch body;

external anode connection means for electrically connecting said anode connection outside said watch, through said hole;

external cathode connection means for electrically connecting said cathode connection outside said watch; and said external anode connection means and said external cathode connection means have different shapes and sizes so that said anode connection is not accessible through said hole by said external cathode connection means; and wherein said watch body has a chassis, and said external cathode connection means electrically connects said cathode connection via said chassis.

2. A system for charging a button battery of a watertight watch of a type having a body and cover, without taking off the cover, and without altering watertight conditions thereof, in which charging is performed by a voltage drop, while maintaining an amperage through a voltage differential, and with the battery including an anode and cathode, said system comprising:

an anode connection in the watch body for connection to the anode of the battery;

a cathode connection in the watch body for connection to the cathode of the battery;

a first hole in the watch body;

external anode connection means for electrically connecting said anode connection outside said watch, through said hole;

a second hole in the watch body, said second hole having a shape and dimensions different from a shape and dimensions of said first hole;

external cathode connection means for electrically connecting said cathode connection outside said watch, through said second hole;

said external anode connection means and said external cathode connection means have different shapes and sizes so that said anode connection is not accessible through said first hole by said external cathode connection means; and said anode connection is not accessible through said first hole by said external cathode connection means and said cathode connection is not accessible through said second hole by said external anode connection means.

3. A system according to claim 2, wherein one of said first hole and said second hole has a substantially circular shape, and the other of said first hole and said second hole has a substantially oval shape.

4. A system for charging a button battery of a watertight watch of a type having a body and cover, without taking off the cover, and without altering watertight conditions thereof, in which charging is performed by a voltage drop, while maintaining an amperage through a voltage differential, and with the battery including an anode and cathode, said system comprising:

an anode connection in the watch body for connection to the anode of the battery;

a cathode connection in the watch body for connection to the cathode of the battery;

a first hole in the watch body;

external anode connection means for electrically connecting said anode connection outside said watch, through said hole;

a second hole in the watch body;

external cathode connection means for electrically connecting said cathode connection outside said watch, through said second hole;

said external anode connection means and said external cathode connection means have different shapes and sizes so that said anode connection is not accessible through said first hole by said external cathode connection means; and each of said first and second holes is elongated and each has an exterior that is insulated and has an interior surface, at least a portion of the interior surface being electrically connected to said anode connection and cathode connection, respectively.

5. A system according to claim 4, further comprising:

an insulating O-ring slidable in each of said first and second holes;

a spring in each of the first and second holes for biasing the respective O-rings outwardly of said first and second holes; and a stop in each of said first and second holes for limiting travel of said respective O-rings in said first and second holes; and wherein:

said external anode connection means includes a charging pin insertable in said first hole, such that insertion of said charging pin in said first hole moves said O-ring in said first hole in a direction against a biasing force of the respective spring to enable electrical connection between said charging pin and said portion of said first hole so as to electrically connect said charging pin to said anode connection, and said external cathode connection means includes a charging pin insertable in said second hole, such that insertion of said charging pin in said second hole moves said O-ring in said second hole in a direction against a biasing force of the respective spring to enable electrical connection between said charging pin and said portion of said second hole so as to electrically connect said charging pin to said cathode connection.

6. A system for charging a button battery of a watertight watch of a type having a body and cover, without taking off the cover, and without altering watertight conditions thereof, in which charging is performed by a voltage drop, while maintaining an amperage through a voltage differential, and with the battery including an anode and cathode, said system comprising:

an anode connecting in the watch body for connection to the anode of the battery;

a cathode connection in the watch body for connection to the cathode of the battery;

a first elongated hole in the watch body, having an exterior that is insulated and having an interior surface, at least a portion of the interior surface being electrically connected to said anode connection;

external anode connection means for electrically connecting said anode connection outside said watch, through said hole;

external cathode connection means for electrically connecting said cathode connection outside said watch; and said external anode connection means and said external cathode connection means have different shapes and sizes so that said anode connection is not accessible through said hole by said external cathode connection means.

7. A system according to claim 6, further comprising:

an insulating O-ring slidable in the first hole;

a spring in the first hole for biasing the O-ring outwardly of said first hole; and a stop in said first hole for limiting travel of said O-ring in said first hole; and wherein said external anode connection means includes a charging pin insertable in said first hole, such that insertion of said charging pin in said first hole moves said O-ring in a direction against a biasing force of said spring to enable electrical connection between said charging pin and said portion of said first hole so as to electrically connect said charging pin to said anode connection.

* * * * *